United States Patent
Toyohira et al.

(10) Patent No.: US 10,415,664 B2
(45) Date of Patent: Sep. 17, 2019

(54) VEHICLE SUSPENSION SYSTEM

(71) Applicant: HONDA MOTOR CO., LTD., Tokyo (JP)

(72) Inventors: Tomoya Toyohira, Wako (JP); Takafumi Kato, Wako (JP); Satoshi Ohno, Wako (JP); Atsuhiko Yoneda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 15/595,284

(22) Filed: May 15, 2017

(65) Prior Publication Data
US 2018/0156303 A1    Jun. 7, 2018

(30) Foreign Application Priority Data
Mar. 16, 2016  (JP) .................................. 2016-052878

(51) Int. Cl.
*F16F 13/00*   (2006.01)
*B60G 15/02*   (2006.01)
(Continued)

(52) U.S. Cl.
CPC ............ *F16F 13/002* (2013.01); *B60G 15/02* (2013.01); *B60G 15/065* (2013.01); *B60G 17/02* (2013.01);
(Continued)

(58) Field of Classification Search
CPC .... F16F 13/002; F16F 15/035; B60G 15/065; B60G 17/02; B60G 15/02; B60G 17/021;
(Continued)

(56) References Cited

U.S. PATENT DOCUMENTS

| | | | | |
|---|---|---|---|---|
| 4,830,398 A | * | 5/1989 | Williams | B60G 17/0152 267/64.26 |
| 5,097,419 A | * | 3/1992 | Lizell | B60G 17/016 188/266.5 |
| 5,490,068 A | * | 2/1996 | Shimizu | B60G 17/018 280/5.504 |
| 5,983,150 A | * | 11/1999 | Sasaki | B60G 17/0165 701/38 |
| 6,502,837 B1 | * | 1/2003 | Hamilton | B60G 17/0152 280/5.515 |

(Continued)

FOREIGN PATENT DOCUMENTS

| | | | | |
|---|---|---|---|---|
| JP | | 63258207 A | * 10/1988 | ........... B60G 17/015 |
| JP | | S63258207 A | 10/1988 | |

(Continued)

OTHER PUBLICATIONS

Notice of Reasons of Rejection for Japanese Application No. 2016-052878, dated Nov. 14, 2017, 5 pages.

*Primary Examiner* — Paul N Dickson
*Assistant Examiner* — Timothy Wilhelm
(74) *Attorney, Agent, or Firm* — Armstrong Teasdale LLP

(57) ABSTRACT

A vehicle suspension system (3) includes an electromagnetic damper (7) provided with a sprung member (8) and an unsprung member (9) to apply a drive force and a damping force between the sprung member and the unsprung member, and a control unit (10) for controlling the electromagnetic damper. A target load for the electromagnetic damper is determined based on the unsprung member demand load that attenuates a vertical vibration of the unsprung member, and the sprung member demand load that restrains a vertical displacement of the sprung member. An absolute value of the sprung member demand load is reduced when a sprung member frequency is in an unsprung member resonance frequency range.

9 Claims, 5 Drawing Sheets

(51) Int. Cl.
*B60G 15/06* (2006.01)
*B60G 17/02* (2006.01)
*F16F 15/03* (2006.01)

(52) U.S. Cl.
CPC ...... *B60G 17/021* (2013.01); *B60G 2202/152* (2013.01); *B60G 2202/322* (2013.01); *B60G 2202/413* (2013.01); *B60G 2202/416* (2013.01); *B60G 2202/432* (2013.01); *B60G 2500/10* (2013.01); *B60G 2500/30* (2013.01); *B60G 2600/22* (2013.01); *F16F 15/035* (2013.01)

(58) Field of Classification Search
CPC ........ B60G 2202/416; B60G 2202/432; B60G 2500/30; B60G 2202/413; B60G 2202/322; B60G 2600/22; B60G 2202/152; B60G 2500/10
See application file for complete search history.

(56) References Cited

U.S. PATENT DOCUMENTS

| | | | | |
|---|---|---|---|---|
| 6,721,641 | B1* | 4/2004 | Denne | B60G 17/0157 |
| | | | | 280/5.515 |
| 7,005,816 | B2* | 2/2006 | Hio | F16F 15/035 |
| | | | | 188/266 |
| 8,596,430 | B2* | 12/2013 | Ogawa | B60G 17/015 |
| | | | | 188/267 |
| 9,452,656 | B2* | 9/2016 | Kubota | B60G 17/08 |

FOREIGN PATENT DOCUMENTS

| | | |
|---|---|---|
| JP | H07205629 A | 8/1995 |
| JP | 2010253989 A | 11/2010 |

* cited by examiner

VEHICLE SUSPENSION SYSTEM

TECHNICAL FIELD

The present invention relates to a vehicle suspension system.

BACKGROUND ART

A known vehicle suspension system includes a thrust generating device for regulating a relative displacement between a sprung member and an unsprung member by generating a thrust force, and a damper connected in parallel with the thrust generating device to produce a damping force according to a relative velocity between the sprung member and the unsprung member. See JP2010-253989A, for instance. In the prior art disclosed in JP2010-253989A, a sprung member control command value is computed according to a skyhook control (ride quality oriented control) which brings the sprung member velocity to zero with the aim to control the vertical vibration of the sprung member, and a unsprung member control command value is computed according to a damping control (road tracking oriented control) with the aim to improve the road tracking performance of the wheel. The control command value for the thrust generating device is computed by adding the sprung member control command value to the unsprung member control command value. In such a control process, the sprung member control command value and the unsprung member control command value that are determined may cancel out each other. Therefore, in the prior art disclosed in JP2010-253989A, the unsprung member velocity used for computing the unsprung member control command value is processed by a control property adjustment filter to control the damping force control by bringing the gain of the filter close to zero when the vibration frequency of the unsprung member is lower than the unsprung member resonance frequency. Thereby, in the region of the sprung resonance frequency which is lower than the unsprung member resonance frequency, the sky hook control is dominant and the ride quality is given a higher priority.

However, according to the control process disclosed in JP2010-253989A, because the damping force control is restrained in a frequency range lower than the unsprung member resonance frequency range, an appropriate measure is required to be taken in a situation where a transient input, instead of a vibratory input, is applied to the wheel (unsprung member) such as when the wheel rides over a short bump. Particularly in the case of an electromagnetic damper (electromagnetic actuator) which produces a drive force and a damping force with an electric motor, when the damping force control is restrained, a hydraulic damper is required to be provided in parallel with the electromagnetic damper. When such a hydraulic damper is used, the electromagnetic damper is required to produce a drive force for overcoming the damping force of the hydraulic damper so that the size of the suspension system is required to be increased, and the control mechanism is made more complex.

SUMMARY OF THE INVENTION

In view of such problems of the prior art, a primary object of the present invention is to provide a vehicle suspension system using an electromagnetic damper which allows the size of the system to be minimized, and the control mechanism to be simplified.

A second object of the present invention is to provide a vehicle suspension system using an electromagnetic damper which can improve both the ride quality and the road tracking performance of the wheel.

The present invention achieves such objects by providing a vehicle suspension system (3), comprising: an electromagnetic damper (7) provided with a sprung member (8) and an unsprung member (9) of a vehicle (1) to apply a drive force and a damping force between the sprung member and the unsprung member; and a control unit (10) for controlling the electromagnetic damper, the control unit comprising: an unsprung member demand load computing unit (54) for computing an unsprung member demand load that attenuates a vertical vibration of the unsprung member; a sprung member demand load computing unit (56) for computing a sprung member demand load that restrains a vertical displacement of the sprung member; and a target load computing unit (57) for computing a target load for the electromagnetic damper based on the unsprung member demand load and the sprung member demand load; the sprung member demand load computing unit being configured to reduce an absolute value of the sprung member demand load to be forwarded to the target load computing unit when a sprung member frequency given as a frequency of a vertical vibration of the sprung member is in an unsprung member resonance frequency range where a resonance of the unsprung member can occur.

In this arrangement, when the vibration frequency of the sprung member is in the resonance frequency range of the unsprung member, owing to a decrease in the sprung member demand load, the influence of the unsprung member demand load on the target load increases so that the vibration of the unsprung member is favorably restrained, and the road tracking performance of the wheel improves. Since the target load is computed based on the unsprung member demand load regardless of the vibration frequency FU of the sprung member, when a transient input, as opposed to a vibratory input, is applied to the unsprung member such as when the wheel rides over a single short bump, the electromagnetic damper can generate an appropriate damping force (load). Therefore, the sizes of the electromagnetic damper and the suspension system can be minimized, and the control of the electromagnetic damper can be simplified.

In this invention, the suspension system may further comprise a correction unit (62) for reducing an absolute value of the sprung member demand load to be forwarded to the target load computing unit when the sprung member frequency is in the unsprung member resonance frequency range by reducing the absolute value of the sprung member demand load when the sprung member frequency is higher than a prescribed threshold frequency (FTH1, FTH2), the correction unit being configured to vary the threshold frequency based on a yaw rate (YR) of the vehicle.

In this arrangement, when the sprung member frequency is in the unsprung member resonance frequency range, the influence of the sprung member demand load on the target load can be varied depending on the cornering condition of the vehicle. In other words, depending on the cornering condition of the vehicle, the priorities of the road tracking performance of the wheel and the ride quality can be appropriately determined.

In this invention, the correction unit may raise the threshold frequency with a decreasing yaw rate.

In this arrangement, when the vehicle is traveling straight ahead, and the tracking performance of the wheel is not required, as opposed to the case where the vehicle is cornering, even if the sprung member frequency is in the unsprung member resonance frequency range, the influence of the sprung member demand load is increased, and the ride quality is improved. When the vehicle is cornering, the influence of the sprung member demand load is decreased, and the road tracking performance of the wheel is improved.

In this invention, the correction unit may be configured to vary the threshold frequency based on a yaw rate of the vehicle and a vehicle speed (V).

Thereby, the influence of the sprung member demand load on the target load can be varied depending on the cornering condition of the vehicle and the vehicle speed.

In a preferred embodiment of the present invention, the correction unit is configured to raise the threshold frequency when the yaw rate is smaller than a prescribed yaw rate determination value (YR1) or the vehicle speed is lower than a prescribed vehicle speed determination value (V1) to a value higher than that when the yaw rate is greater than the prescribed yaw rate determination value and the vehicle speed is higher than the prescribed vehicle speed determination value.

In this arrangement, when the vehicle is not cornering at a high speed, and the tracking performance of the wheel is not important, even if the sprung member frequency is in the unsprung member resonance frequency range, the influence of the sprung member demand load on the target load is increased, and the ride quality is improved. If the vehicle is cornering at a high speed, the influence of the sprung member demand load on the target load is increased, and the road tracking performance of the wheel is improved.

In a preferred embodiment of the present invention, the correction unit is configured to set the threshold frequency in a range of 3 Hz and 6 Hz when the yaw rate is greater than the prescribed yaw rate determination value and the vehicle speed is higher than the prescribed vehicle speed determination value.

In a typical unsprung member resonance frequency range having a peak at 10 Hz and the amplitude to start increasing from about 6 Hz, the influence of the sprung member demand load on the target load is appropriately restrained so that the road tracking performance of the wheel is improved.

In the present invention, the correction unit may be configured to gradually decrease the sprung member demand load with an increase in the sprung member frequency when the sprung member frequency is greater than the threshold frequency.

Thereby, as the sprung member frequency approaches the peak of the unsprung member resonance frequency, the influence of the sprung member demand load on the target load diminishes so that the road tracking performance of the wheel is improved.

In a preferred embodiment of the present invention, the unsprung member demand load computing unit is configured to compute the unsprung member demand load based on a relative speed between the sprung member and the unsprung member, and to compute the sprung member demand load based on a vertical velocity of the sprung member.

Thus, according to the present invention, in a vehicle suspension system using an electromagnetic damper, the size of the system can be minimized, and the control mechanism can be simplified. At the same time, both the ride quality and the road tracking performance of the wheel can be improved.

DESCRIPTION OF THE PREFERRED EMBODIMENT(S)

An embodiment of a vehicle suspension system according to the present invention is described in the following with reference to the appended drawings.

Figure 1:
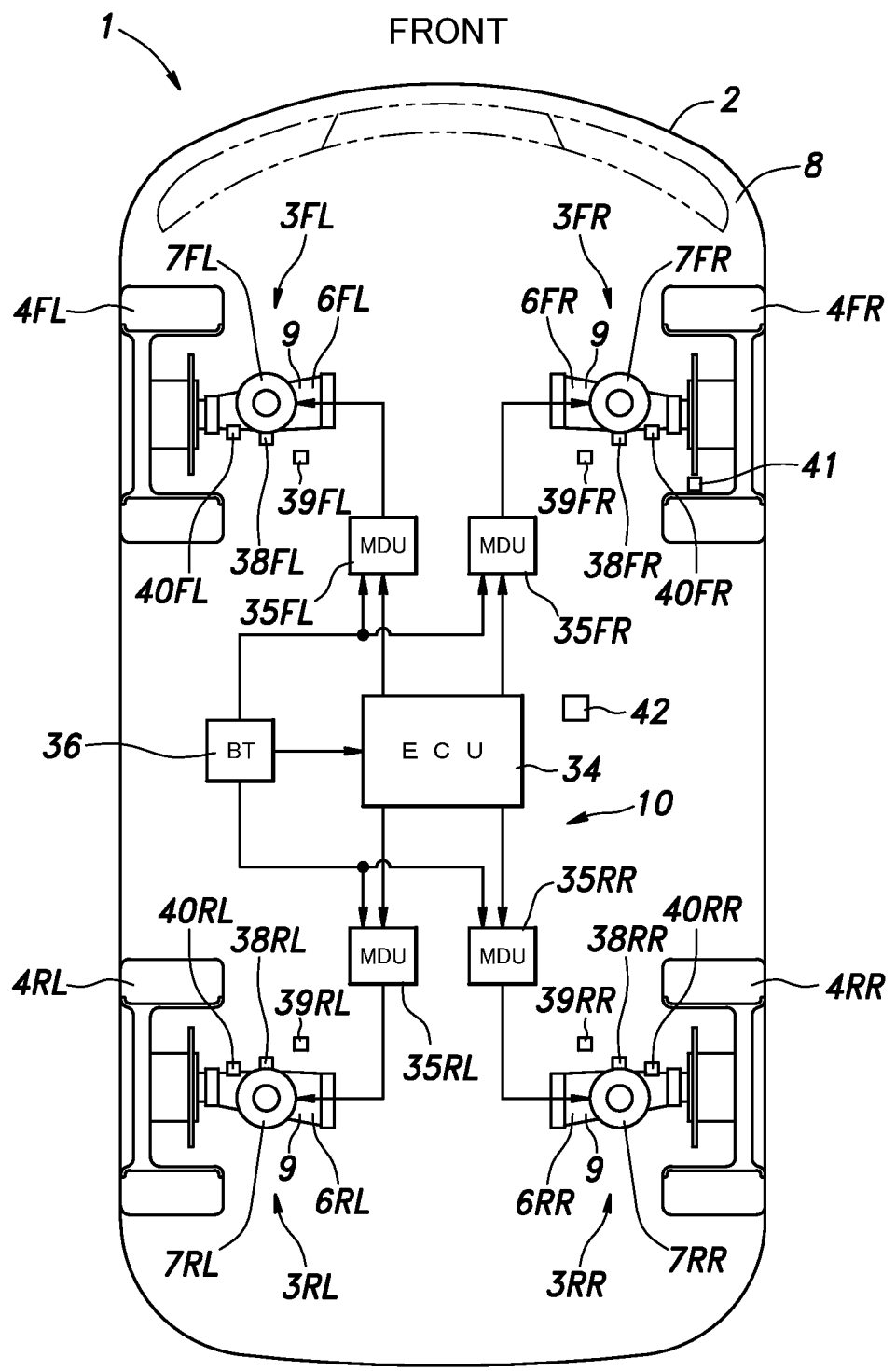
FIG. 1 is a diagram of the overall structure of a vehicle fitted with a suspension system of an embodiment of the present invention.

As shown in FIG. 1, a four-wheel vehicle 1 fitted with a suspension system embodying the present invention includes a vehicle body 2, suspension systems 3 supported by the vehicle body 2 and wheels 4 supported by the respective suspension systems 3. The suspension systems 3 and the associated wheels 4 are provided in four separate locations of the vehicle body 2, and are each distinguished from one another by adding a suffix FR, FL, RR, RL after the numeral denoting each particular component. These suffixes may be omitted when they are collectively discussed in the following description.

The suspension system 3 is pivotally supported by the vehicle body 2, and includes a suspension arm 6 supporting the wheel 4 via a knuckle (not shown in the drawings), and an electromagnetic damper 7 interposed between a free end part of the suspension arm 6 or the knuckle and the vehicle body 2. The major part of the vehicle body 2 connected to the upper end of the electromagnetic damper 7 is referred to as a sprung member 8, and the part of the vehicle body 2 and the wheel 4 connected to the lower end of the electromagnetic damper 7 is referred to as an unsprung member 9.

The electromagnetic damper 7 is configured to selectively provide a drive force (thrust force) and a damping force that acts between the sprung member 8 and the unsprung member 9 under the control of a control unit 10. In other words, the electromagnetic damper 7 functions as an electromagnetic actuator in addition as a conventional damper.

Figure 2:
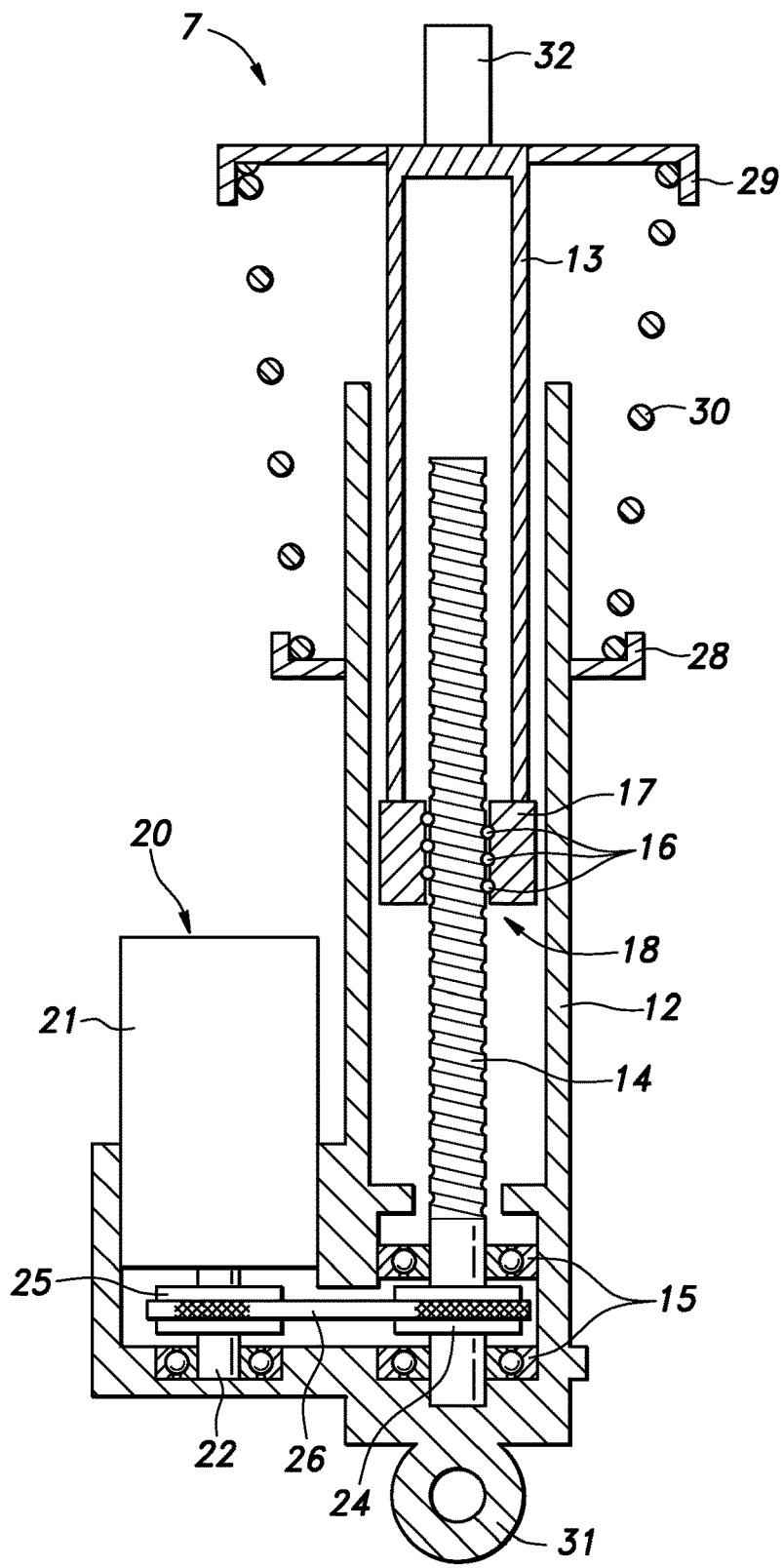
FIG. 2 is a sectional view of an electromagnetic damper of the suspension system.

As shown in FIG. 2, the electromagnetic damper 7 includes a cylindrical outer tube 12 and a cylindrical inner tube 13 having one end inserted into the outer tube 12. The inner tube 13 is arranged coaxially with the outer tube 12 and is displaceable in the axial direction with respect to the outer tube 12. The outer tube 12 and the inner tube 13 have mutually cooperating stoppers (not shown) so that the relative displacement range along the axial direction is restricted within a predetermined range, and the relative rotation around the axial line is prevented. Inside the outer tube 12, a screw rod 14 is arranged coaxially with the outer tube 12. The screw rod 14 is rotatably supported by the outer tube 12 via bearings 15 at an end remote from the inner tube 13. On the outer peripheral surface of the screw rod 14, a spiral screw groove is formed for receiving a plurality of balls 16. A nut 17 threading with the screw rod 14 via the balls 16 is coupled to the end portion of the inner tube 13 inserted into the outer tube 12. An end portion of the screw rod 14 on the side of the inner tube 13 passes through the nut 17 and extends into the inner tube 13. The screw rod 14, the balls 16, and the nut 17 constitute a ball screw 18.

A housing 21 of an electric motor 20 is attached to an external extension of the outer tube 12 such that an output shaft 22 of the electric motor 20 extends in parallel with the screw rod 14. The electric motor 20 may consist of a per se known motor such as a three-phase brushless motor. The end portion of the screw rod 14 remote from the inner tube 13 is fitted with a first pulley 24, and the output shaft 22 of the electric motor 20 is fitted with a second pulley 25. An endless belt 26 is passed around the first pulley 24 and the second pulley 25. The outer tube 12 is formed with a slot for passing through the endless belt 26.

The outer periphery of an intermediate part of the outer tube 12 is fixedly provided with a first spring seat 28 consisting of a radial flange, and the outer periphery of an upper end part of the inner tube 13 is fixedly provided with a second spring seat 29 consisting of a radial flange. A compression coil spring 30 is interposed between the first spring seat 28 and the second spring seat 29. The compression coil spring 30 is pre-stressed, and normally urges the outer tube 12 and the inner tube 13 away from each other.

An end of the outer tube 12 remote from the inner tube 13 is fitted with a lower mount 31, and an end of the inner tube 13 remote from the outer tube 12 is fitted with an upper mount 32. In the illustrated embodiment, the lower mount 31 is attached to the suspension arm 6, and the upper mount 32 is attached to the vehicle body 2.

When the outer tube 12 and the inner tube 13 are relatively displaced in the axial direction, the screw rod 14 and the nut 17 are relatively displaced in the axial direction of the screw rod 14, and the screw rod 14 rotates as a result. The rotation of the screw rod 14 is transmitted to the output shaft 22 of the electric motor 20 via the first pulley 24, the belt 26, and the second pulley 25 so that the electric motor 20 rotates. Conversely, when the electric motor 20 rotates, the outer tube 12 and the inner tube 13 are relatively displaced in the axial direction. In this manner, the relative displacement in the axial direction of the outer tube 12 and the inner tube 13, or the extension and retraction of the electromagnetic damper 7, and the rotation of the motor 20 are interchangeable. When the electric motor 20 rotates by the extension and retraction of the electromagnetic damper 7, an electromotive force is induced so that rotational resistance corresponding to the induced electromotive force is generated. Therefore, a damping force is generated against the extension and retraction of the electromagnetic damper 7. In addition, when the electric motor 20 is rotated by external electric power, the electromagnetic damper 7 generates a drive force in the extending direction or the retracting direction in a corresponding manner, causing the electromagnetic damper 7 to extend or retract as the case may be. The drive force and the damping force generated by the electromagnetic damper 7 can be controlled by electric power supplied to the electric motor 20.

The control unit 10 of the vehicle 1 is provided with one ECU 34 (electronic control unit) and four MDUs 35 (motor drive unit) connected to the ECU 34 for controlling the respective electromagnetic dampers 7. Thus, each electromagnetic damper 7 is controlled by the corresponding MDU 35. An onboard battery 36 supplies electric power to the MDUs 35. The ECU 34 includes a microcomputer, ROM, RAM, a peripheral circuit, an input/output interface, and various drivers. Each of the MDUs 35 is composed of a switching circuit including a switching device that controls electric power to be supplied to each electromagnetic damper 7 under the command of the ECU 34.

The ECU 34 receives the output signals from a stroke sensor 38, a sprung member acceleration sensor 39, an unsprung member acceleration sensor 40, a vehicle speed sensor 41, and a yaw rate sensor 42.

The stroke sensor 38 is provided for each electromagnetic damper 7 and is configured to detect the relative position of the outer tube 12 and the inner tube 13, or a stroke XS (the extended and retracted state, a length) of the electromagnetic damper 7, and provides a signal corresponding to the XS to the ECU 34. The sprung member acceleration sensor 39 is configured to detect a sprung member acceleration GU, or a vertical acceleration of a portion of the sprung member 8 (vehicle body 2) corresponding to each wheel 4, and provides a signal corresponding to the sprung member acceleration GU to the ECU 34. The unsprung member acceleration sensor 40 is configured to detect an unsprung member acceleration GL, or a vertical acceleration of the unsprung member 9 (the suspension arm 6), and provides a signal corresponding to the unsprung member acceleration GL to the ECU 34. The vehicle speed sensor 41 is configured to detect a vehicle speed V, and provides a signal corresponding to the rotational speed of the wheel 4 to the ECU 34. The yaw rate sensor 42 is configured to detect the yaw rate YR of the vehicle 1, and provides a signal corresponding to the yaw rate YR to the ECU 34.

Based on the signals from the respective sensors, the ECU 34 computes a target load FT of the electromagnetic damper 7 for each electromagnetic damper 7 and a target current value IT to be supplied to the electric motor 20 of each electromagnetic damper 7 based on the target load FT. Each MDU 35 performs a PWM control for the corresponding electric motor 20 based on the target current value IT and supplies a corresponding target current to the electric motor 20 of each electromagnetic damper 7.

Figure 3:
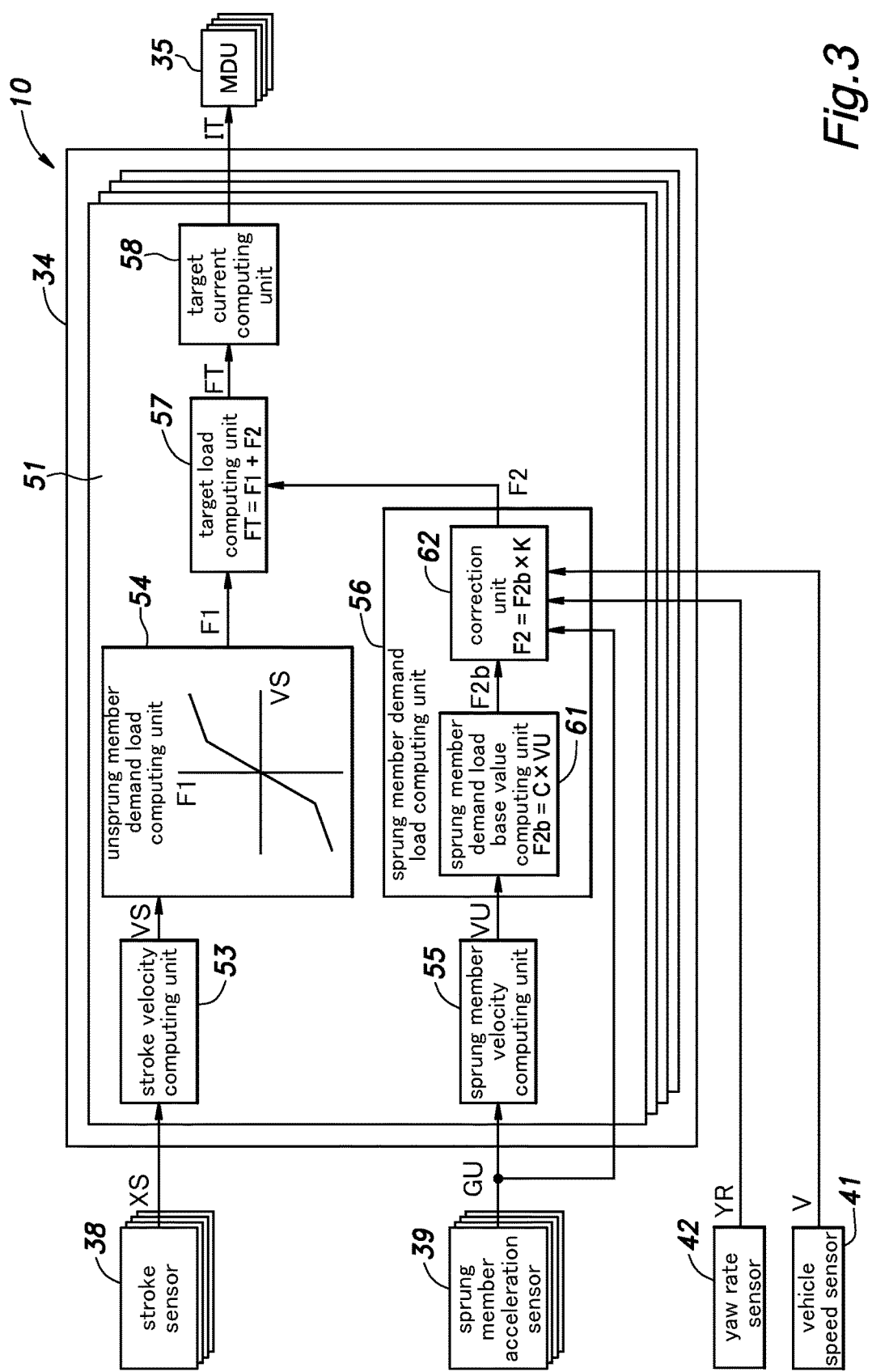
FIG. 3 is a block diagram of a control unit of the suspension system.

FIG. 3 shows a functional block diagram of the ECU 34. As shown in FIG. 3, the ECU 34 includes an output control unit 51 provided for each electromagnetic damper 7 so as to control the corresponding electromagnetic damper 7. Each output control unit 51 includes a stroke velocity computing unit 53, an unsprung member demand load computing unit 54, a sprung member velocity computing unit 55, a sprung member demand load computing unit 56, a target load computing unit 57, and a target current computing unit 58.

The stroke velocity computing unit 53 calculates the stroke velocity VS of the electromagnetic damper 7 by differentiating the stroke XS received from the corresponding stroke sensor 38 with time. The unsprung member demand load computing unit 54 computes an unsprung member demand load F1 in order to reduce the vibration of the unsprung member 9 by damping the extension and retraction movement of the electromagnetic damper 7. The unsprung member demand load computing unit 54 sets an unsprung member demand load F1 by looking up a predetermined map based on the stroke velocity VS received from the stroke velocity computing unit 53. The map defines the relationship between the stroke velocity VS and the unsprung member demand load F1 in such a manner that the greater the stroke velocity VS in the retracting direction is, the greater the load produced by the electromagnetic damper 7 in the extending direction is, and the greater the stroke velocity VS in the extending direction is, the greater the load produced by the electromagnetic damper 7 in the retracting direction is. In other words, the greater the stroke velocity VS is, the greater the damping force (resistive force) produced by the electromagnetic damper 7 becomes.

The sprung member velocity computing unit 55 computes the sprung member velocity VU or the vertical velocity of the sprung member 8 by integrating the sprung member acceleration GU received from the corresponding sprung member acceleration sensor 39 with time.

The sprung member demand load computing unit 56 computes a sprung member demand load F2 so as to suppress the vibration of the sprung member 8 based on the skyhook theory. The sprung member demand load computing unit 56 includes a sprung member demand load base value computing unit 61 and a correction unit 62. The sprung member demand load base value computing unit 61 computes a sprung member demand load base value F2b so as to set the sprung member velocity VU to zero based on the skyhook theory. The sprung member demand load base value computing unit 61 multiplies the sprung member velocity VU received from the sprung member velocity computing unit 55 by a sprung member gain (skyhook gain) C set in advance to compute the sprung member demand load base value F2b. The sprung member demand load base value F2b is set so that the greater the sprung member velocity VU in the upward direction is, the greater the force (drive force) produced by the electromagnetic damper 7 in the retracting direction is, and the greater the sprung member velocity VU in the downward direction is, the greater the force (drive force) produced by the electromagnetic damper 7 in the extending direction is.

Figure 4:
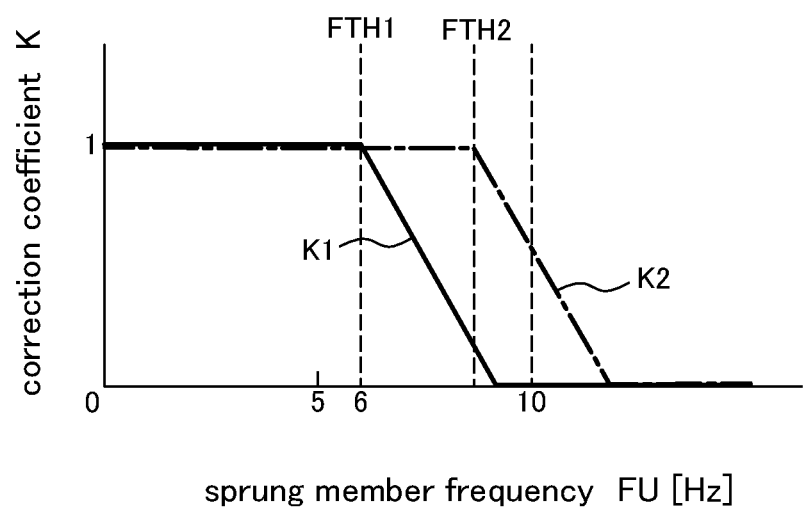
FIG. 4 is a graph showing a relationship between sprung member frequency and a correction coefficient.

When the frequency of the vertical vibration of the sprung member 8 (hereinafter referred to as the sprung member frequency FU) is in an unsprung member resonance frequency range where the resonance of the unsprung member 9 can occur, the correction unit 62 decreases the absolute value of the sprung member demand load F2. The unsprung member resonance frequency range is a frequency range around 10 Hz, and may be in the range of 6 Hz to 15 Hz. The correction unit 62 computes the sprung member demand load F2 by multiplying the sprung member demand load base value F2b by a correction coefficient K (FU). As shown in FIG. 4, the correction coefficient K (K1, K2) varies in dependence on the sprung member frequency FU, and is 1 when the sprung member frequency FU is lower than a predetermined threshold frequency FTH (FTH1, FTH2), and progressively decreases with an increase in the sprung member frequency FU when the sprung member frequency FU is greater than the predetermined threshold frequency FTH. The threshold frequency FTH is set in the range of 3 Hz to 10 Hz. Therefore, when the sprung member frequency FU is equal to or higher than the threshold frequency FTH, the sprung member demand load base value F2b is multiplied by the correction coefficient K so that the sprung member demand load F2 is smaller than the sprung member demand load base value F2b. On the other hand, when the sprung member frequency FU is lower than the threshold frequency FTH, since the correction coefficient K is 1, the sprung member demand load F2 is set to the same value as the sprung member demand load base value F2b. The sprung member frequency FU is computed by the correction unit 62 based on the sprung member acceleration GU.

Figure 5:
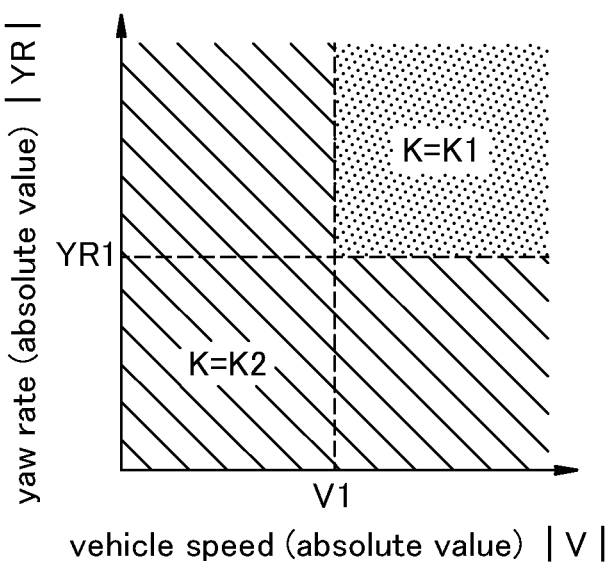
FIG. 5 is a graph showing a relationship between yaw rate and a correction coefficient.

The correction coefficient K is set such that when the vehicle 1 is undergoing a high speed turn, the threshold frequency FTH is lower than the values that are set in other situations. As shown in FIG. 5, the correction unit 62 sets one of the first correction coefficient K1 and the second correction coefficient K2 as the correction coefficient K based on the absolute value of the yaw rate YR and the absolute value of the vehicle speed V. When the absolute value of the yaw rate YR is greater than a predetermined yaw rate determination value YR1 and the vehicle speed V is greater than a predetermined vehicle speed determination value V1, the correction unit 62 sets the first correction coefficient K1 as the correction coefficient K. When the absolute value of the yaw rate YR is equal to or less than the yaw rate determination value YR1 or the vehicle speed V is equal to or less than the vehicle speed determination value V1, the correction unit 62 sets the second correction coefficient K2 as the correction coefficient K. The yaw rate determination value YR1 is used for determining whether or not the vehicle 1 is cornering, and the vehicle speed determination value V1 is used for determining whether or not the vehicle 1 is traveling at a high speed.

As shown in FIG. 4, the threshold frequency FTH1 of the first correction coefficient K1 is set to a value smaller than the threshold frequency FTH2 of the second correction coefficient K2. The threshold frequency FTH1 of the first correction coefficient K1 is, not exclusively, set to be in the range of 3 Hz and 6 Hz.

The target load computing unit 57 adds the unsprung member demand load F1 received from the unsprung member demand load computing unit 54 to the sprung member demand load F2 received from the sprung member demand load computing unit 56 to compute the target load FT of the electromagnetic damper 7. The target current computing unit 58 computes the target current value IT corresponding to the target load FT by referring to a map which defines the relationship between the predetermined target load FT and the target current value IT, and forwards the target current value IT to the corresponding MDU 35. The MDU 35 supplies electric current corresponding to the target current value IT to the corresponding electromagnetic damper 7. For example, the MDU 35 determines a duty ratio corresponding to the target current value IT, and controls the switching device according to the duty ratio.

The suspension system 3 discussed above provides various advantages. Because the electromagnetic dampers 7 of the suspension system 3 of the foregoing embodiment is controlled according to the unsprung member demand load F1 for controlling the vertical vibration of the unsprung member 9 and the sprung member demand load F2 for controlling the vertical displacement of the sprung member 8, both the road tracking property of the wheels 4 and the ride quality of the vehicle can be improved substantially under all conditions.

The unsprung member demand load F1 and the sprung member demand load F2 may be set in mutually opposite directions and cancel each other under certain circumstances. However, when the sprung member frequency FU falls within the unsprung member resonance frequency range, the sprung member demand load F2 is set to be smaller than the sprung member demand load base value F2b so that the influence of the sprung member demand load F2 on the target load FT is minimized, and the influence of the unsprung member demand load F1 on the target load FT is maximized Thereby, in the unsprung member resonance frequency range where the resonance of the unsprung member 9 can occur, the electromagnetic damper 7 appropriately produces the load for suppressing the vibration of the unsprung member 9 so that the vibration of the unsprung member 9 is favorably suppressed. As a result, the road tracking performance of the wheel 4 is improved. In the sprung resonance frequency range (around 1.5 Hz) where the resonance of the sprung member 8 can occur, normally, the vibration of the unsprung member 9 is suppressed and the unsprung member demand load F1 is small so the influence of the sprung member demand load F2 on the target load FT is dominant with the result that the vibration of the sprung member 8 is appropriately suppressed.

Also, since the target load FT is computed based on the unsprung member demand load F1 regardless of the vibration frequency FU of the sprung member 8, when a transient input, as opposed to a vibratory input, is applied to the unsprung member 9 such as when the wheel 4 rides over a single short bump, the electromagnetic damper 7 can generate an appropriate damping force (load). As a result, the suspension system 3 does not require an additional damper such as another hydraulic damper in addition to the electromagnetic damper 7. Since no additional damper is required, the drive force required for the electromagnetic damper 7 is reduced, and the size of the electromagnetic damper 7 can be minimized. Furthermore, by reducing the size of the electromagnetic damper 7 and omitting an additional damper, it is possible to reduce the overall size of the suspension system 3. Further, since no additional damper is provided, the control of the electromagnetic damper 7 is simplified.

The correction coefficient K is changed depending on the running condition of the vehicle 1, and the reduction in the sprung member demand load F2 is small except for the case where the vehicle 1 is cornering at a high speed. As a result, when the vehicle is cornering at a high speed, the influence of the sprung member demand load F2 on the target load FT is reduced so that the influence of the unsprung member demand load F1 on the target load FT increases, and the road tracking performance of the wheel 4 improves. On the other hand, when the vehicle 1 is in a state other than a high speed cornering, the sprung member demand load F2 strongly affects the target load FT so that the ride quality is improved.

Although the present invention has been described in terms of a preferred embodiment thereof, it is obvious to a person skilled in the art that various alterations and modifications are possible. For example, in the above embodiment, the sprung member demand load computing unit 56 multiplies the sprung member demand load F2 by the correction coefficient K to compute the sprung member demand load F2 so that the sprung member demand load F2 may be smaller than the sprung member demand load base value F2b in the unsprung member resonance frequency range. However, the sprung member demand load F2 may also be computed by subtracting a predetermined correction amount from the sprung member demand load base value F2b in another embodiment. Further, the sprung member demand load computing unit 56 may reduce the sprung member demand load F2 by correcting at least one of the sprung member velocity VU and the sprung member gain C in the unsprung member resonance frequency range. As discussed above, it suffices if, when the sprung member frequency FU is in the unsprung member resonance frequency range, the sprung member demand load computing unit 56 reduces the absolute value of the sprung member demand load F2 as compared with the other cases. This may also be accomplished in other ways without departing from the spirit of the present invention.

In the above embodiment, the correction coefficient K was set as either the first correction coefficient K1 or the second correction coefficient K2 based on the yaw rate YR and the vehicle speed V, but may also be set based on the yaw rate YR alone or the vehicle speed V alone. In the above embodiment, the correction coefficient K is selected from the two correction coefficients K1 and K2. However, the correction coefficient K may also be selected from three or more correction coefficients. Further, the correction coefficient K may be set so that the threshold frequency gradually declines in accordance with an increase in the yaw rate YR.

The invention claimed is:

1. A vehicle suspension system, comprising:
   an electromagnetic damper provided with a sprung member and an unsprung member of a vehicle to apply a drive force and a damping force between the sprung member and the unsprung member; and
   a control unit for controlling the electromagnetic damper; the control unit comprising:
   an unsprung member demand load computing unit for computing an unsprung member demand load that attenuates a vertical vibration of the unsprung member;
   a sprung member demand load computing unit for computing a sprung member demand load that restrains a vertical displacement of the sprung member; and
   a target load computing unit for computing a target load for the electromagnetic damper based on the unsprung member demand load and the sprung member demand load;
   the sprung member demand load computing unit being configured to reduce an absolute value of the sprung member demand load to be forwarded to the target load computing unit when a sprung member frequency given as a frequency of a vertical vibration of the sprung member is in an unsprung member resonance frequency range where a resonance of the unsprung member can occur.

2. The vehicle suspension system according to claim 1, further comprising a correction unit for reducing an absolute value of the sprung member demand load to be forwarded to the target load computing unit when the sprung member frequency is in the unsprung member resonance frequency range by reducing the absolute value of the sprung member demand load forwarded to the target load computing unit when the sprung member frequency is higher than a prescribed threshold frequency, the correction unit being configured to vary the threshold frequency based on a yaw rate of the vehicle.

3. The vehicle suspension system according to claim 2, wherein the correction unit raises the threshold frequency with a decreasing yaw rate.

4. The vehicle suspension system according to claim 2, wherein the correction unit is configured to vary the threshold frequency based on a yaw rate of the vehicle and a vehicle speed.

5. The vehicle suspension system according to claim 4, wherein the correction unit is configured to raise the threshold frequency when the yaw rate is smaller than a prescribed yaw rate determination value or the vehicle speed is lower than a prescribed vehicle speed determination value to a value higher than that when the yaw rate is greater than the prescribed yaw rate determination value and the vehicle speed is higher than the prescribed vehicle speed determination value.

6. The vehicle suspension system according to claim 5, wherein the correction unit is configured to set the threshold frequency in a range of 3 Hz and 6 Hz when the yaw rate is greater than the prescribed yaw rate determination value and the vehicle speed is higher than the prescribed vehicle speed determination value.

7. The vehicle suspension system according to claim 2, wherein the correction unit is configured to gradually decrease the sprung member demand load with an increase in the sprung member frequency when the sprung member frequency is greater than the threshold frequency.

8. The vehicle suspension system according to claim 1, wherein the unsprung member demand load computing unit is configured to compute the unsprung member demand load based on a relative speed between the sprung member and the unsprung member, and to compute the sprung member demand load based on a vertical velocity of the sprung member.

9. The vehicle suspension system according to claim 1, further comprising a sprung member velocity computing unit for computing a vertical velocity of the sprung member by integrating the sprung member acceleration received from the corresponding sprung member acceleration sensor with time,
  wherein the sprung member demand load computing unit is configured to compute the sprung member demand load based on the vertical velocity of the sprung member.

\* \* \* \* \*